UNITED STATES PATENT OFFICE.

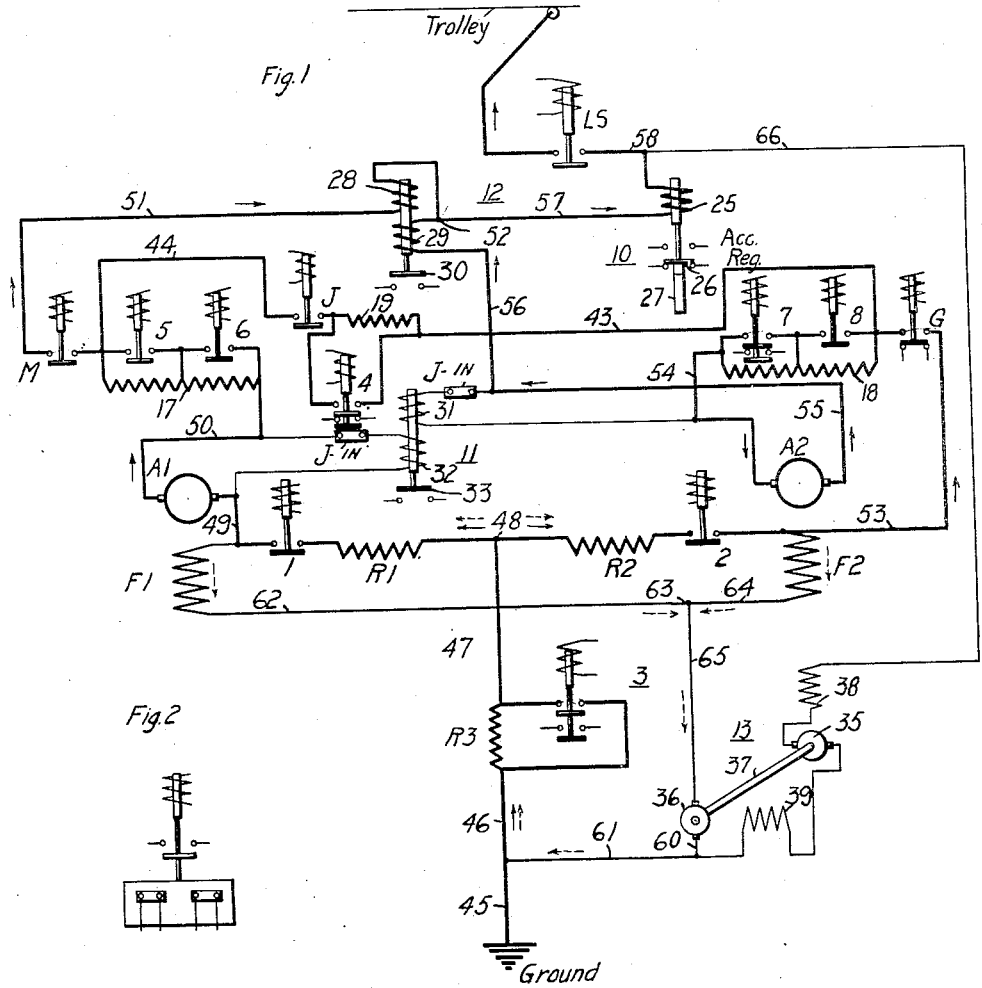

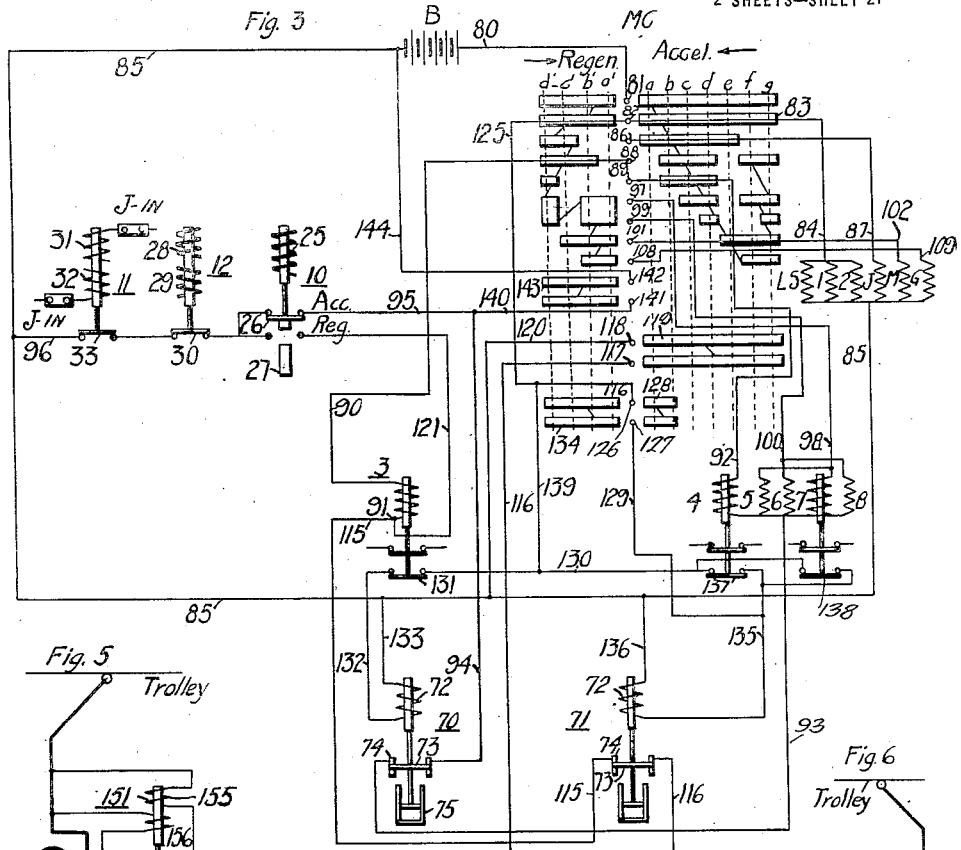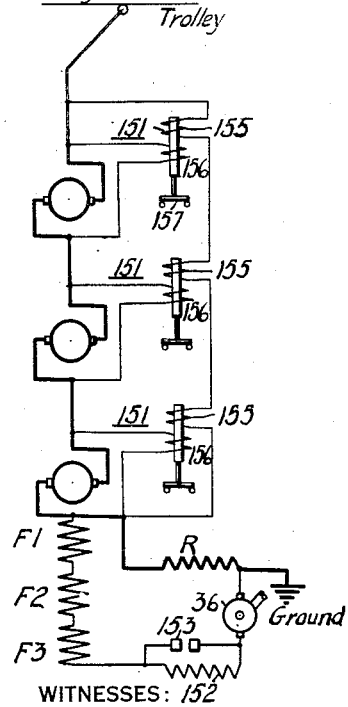

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,371,559.     Specification of Letters Patent.     Patented Mar. 15, 1921.

Application filed July 5, 1917. Serial No. 178,550.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Systems of Control, of which the following is a specification.

My invention relates to systems of control and especially to the automatic control of dynamo-electric machines under predetermined abnormal conditions.

In the prior art, various systems have been proposed for preventing slippage and skidding of the wheels of a locomotive or other electric railway vehicle during either the accelerating or the regenerative period, some systems disclosing means for entirely interrupting the machine circuits under such abnormal conditions and other systems illustrating means for weakening the field excitation of one of the machines under such conditions of slippage or skidding. Although the complete interruption of machine circuits to eliminate slippage may be satisfactory at times during acceleration, the complete loss of braking torque during regeneration is undesirable, if not dangerous. Furthermore, in order to weaken the field excitation of the individual machines, separate exciting circuits for each of them are required, which is again undesirable, in the matter of expense and weight, for example.

The object of my present invention, therefore, is to provide a relatively simple and inexpensive system for eliminating slippage or skidding of vehicle wheels during either the accelerating or the regenerative period by modifying circuit connections in such manner that occurrences of slight abnormal conditions are immediately compensated for, while, whenever the slippage or skidding conditions are pronounced or relatively long in duration, other circuit connections are also modified to eliminate the abnormal conditions.

My invention may best be understood by reference to the accompanying drawings, wherein Figure 1 is a diagrammatic view of the essential main circuits of a system of control embodying the invention; Fig. 2 is a diagrammatic view showing the complete details of construction of one of the switches that is illustrated in Fig. 1; Fig. 3 is a diagrammatic view of an auxiliary governing system for the main circuits that are illustrated in Fig. 1; Fig. 4 is a sequence chart of well-known form, indicating the normal changes of circuit connections during both acceleration and regeneration; and Fig. 5 and Fig. 6 are simplified diagrammatic views, corresponding to Fig. 1, of modified forms of my invention.

Referring to Fig. 1 of the drawings, the system shown comprises suitable supply-circuit conductors, trolley and ground; a plurality of main dynamo-electric machines respectively having commutator-type armatures A1 and A2 and field windings F1 and F2 of the series type; a plurality of translating devices or stabilizing resistors R1 and R2 that are associated with the respective main machines in a manner to be set forth; a plurality of switches LS, J, 1 to 8, inclusive, M and G for effecting various circuit connections; a polarized relay device 10; a series differential relay 11; a parallel differential relay 12; an auxiliary source of energy for the main field windings, preferably comprising a motor-generator set 13; and a plurality of main-circuit resistors R3, 17, 18 and 19 which are employed to govern the machine operation in a manner to be set forth.

The polarized relay 10 comprises an actuating coil 25 that is traversed by the total main-machine current to electromagnetically actuate a movable contact member or disk 26, with which is operatively associated a permanent magnet 27 or its equivalent. The arrangement of parts is such that when accelerating current traverses the main machines and the actuating coil 25, a magnetic repulsion obtains between the contact disk member 26 and the permanent magnet 27, whereby the relay assumes its upper position marked "Acc.", whereas, during the flow of regenerative current through the actuating coil 25, a magnetic attraction exists between the contact disk member 26 and the permanent magnet 27, the relay, under such conditions, occupying its lower position marked "Reg." The preferable type of polarized relay is that embodying a small motor, but for the sake of simplicity and clearness, I have herein illustrated a solenoid-type relay.

The parallel differential relay 12 comprises a plurality of differentially-related, preferably concentrically-wound, actuating coils 28 and 29 which are respectively energized by the currents traversing the main armatures A1 and A2 during parallel connection thereof, that is, under high-speed accelerating or regenerative conditions. A contact member 30 is electromagnetically actuated to its upper or open position whenever the currents traversing the actuating coils 28 and 29 differ by a predetermined amount, for the purpose of controlling certain auxiliary circuits to be described in connection with Fig. 3.

The series differential relay 11 accomplishes a similar function when the main armatures A1 and A2 are connected in series relation, that is, during the initial accelerating or final regenerative period. Since the current traversing both main machines during series connection thereof is the same under all conditions, the parallel differential relay 12 would be ineffective to produce the desired result and, consequently, the series differential relay 11 is provided with actuating coils 31 and 32 which are respectively connected across the main armatures A2 and A1 to actuate a contact member 33 in accordance with the differential relation of the voltages upon the main armatures. To prevent the series differential relay 11 from governing any auxiliary circuits during the parallel connection of the main machines, the relay may be mechanically or electrically interlocked to prevent such undesirable operation. In the present instance, interlocking contact members J-in, of the familiar type that is fully illustrated in Fig. 2, are connected in circuit with each of the actuating coils 31 and 32. Since the switch J is employed only during series connection of the main machines, as subsequently traced in detail, the employment of such interlocks serves to preclude operative action of the relay device 11, except when the machines are series related.

The motor-generator set 13 is shown as comprising an auxiliary driving or motor armature 35 which is mechanically coupled to a generating or exciting armature 36 by means of a shaft 37, for example. A series-related field winding 38 for the motor armature 35 and an exciting field winding 39 for the generating armature 36 are provided, the complete arrangement of circuits being hereinafter fully traced.

The resistors 17 and 18 are connected in series relation with the respective main armatures A1 and A2 for the familiar purpose of reducing the voltage applied to the armatures under initial "series" and "parallel" accelerating conditions, for example, and sets of switches 5 and 6, and 7 and 8, respectively, are adapted to gradually short-circuit the resistors 17 and 18, as determined by the auxiliary governing system of Fig. 3. The resistor 19 is employed during transitional periods of the main machines from parallel to series relation, or vice versa, to prevent an undesirable current surge. The normally short-circuited resistor R3 is connected in the main circuit of both armatures A1 and A2, and is arranged to be actively inserted in circuit by the opening movement of the switch 3 under conditions to be set forth.

Assuming, for example, that regenerative operation of the system illustrated in Fig. 1 has been inaugurated in any suitable manner, the main armature or regenerative circuit (indicated by the solid arrows) is established from the supply-circuit conductor ground, through conductors 45 and 46, the resistor R3 or its short-circuiting switch 3, and conductor 47 to junction-point 48, where the circuit divides, one branch including stabilizing resistor R1, switch 1 in its closed position, conductor 49, main armature A1, conductor 50, resistor 17, or its associated switches 5 and 6, switch M, conductor 51 and the actuating coil 28 of the parallel differential relay 12 to a second junction-point 52, and the other branch including stabilizing resistor R2, switch 2, conductor 53, switch G, resistor 18 or its short-circuiting switches 7 and 8, conductor 54, main armature A2, conductors 55 and 56 and the actuating coil 29 of the parallel differential relay 12 to the junction-point 52, whence a common circuit is continued through conductor 57, the actuating coil 25 of the polarized relay 10, conductor 58 and the line switch LS to the supply-circuit conductor trolley.

The main field winding or exciting circuit (indicated by the dotted arrows) is established from the positive terminal of the generating armature 36 through conductors 60 and 61 to the conductor 46 and thence to the junction-point 48, as already traced, where the circuit divides, one branch traversing stabilizing resistor R1, switch 1, main field winding F1 and conductor 62 to the junction-point 63, and the other branch traversing stablizing resistor R2, switch 2, main field winding F2 and conductor 64, to the junction-point 63, whence a common circuit is completed through conductor 65 to the negative terminal of the generating armature 36.

An auxiliary circuit is completed from the line switch LS through conductors 58 and 66, field winding 38 and the associated driving armature winding 35, exciting field winding 39 for the generating armature 36 and conductors 61 and 45 to ground.

The regenerative circuit connections just recited are not of my present invention but are fully set forth and claimed in my copending application, Serial No. 44,443, filed August 9, 1915, and patented April 1, 1919, No. 1,298,706. Consequently, only a brief description of the operation thereof will be necessary to afford a thorough comprehension of the present invention.

As indicated by the solid and dotted arrows, respectively representing regenerative and exciting current, such currents traverse the stabilizing resistor R1, for example, in the same direction during the regenerative period. Hence, upon an incipient increase of regenerated current, the correspondingly augmented voltage drop across the resistor R1 immediately and inherently reduces the voltage available for delivery to the main field winding F1 from the generating armature 36, thus causing the current traversing the main armature A1 to subside to a normal value. On the other hand, when an incipient decrease of current traversing the main armature A1 takes place, the converse action results by reason of the peculiar connection of the stabilizing resistor R1, and the main-armature current is raised to the desired average value. Consequently, a substantially constant regenerated current is inherently maintained, irrespective of supply-circuit voltage fluctuations.

A corresponding inherent stabilizing action obtains during accelerating operation of the main machines also. In this case, the main-armature current traverses the resistor R1 in the opposite direction to the exciting current from the generating armature 36. Consequently, upon an increase of current in the main armature, the differential relation of currents effects a decreased voltage drop in the resistor R1 and, therefore, an increased energization of the main field winding F1. In this way, the counter-electromotive force of the main armature A1 is increased to cause a corresponding reduction of the accelerating current in the armature. The converse action takes place in the event of an incipient decrease of accelerating current. Consequently, under accelerating conditions also, the stabilizing resistors R1 and R2 serve to maintain a substantially constant main-machine current, irrespective of supply-circuit voltage fluctuations.

Reference may now be had to Fig. 3, wherein the auxiliary governing system shown comprises the actuating coils of the various switches and the auxiliary contact members of the various relay devices that are shown in Fig. 1, together with a master controller MC that is adapted to occupy a plurality of operative positions $a$ to $g$, corresponding to acceleration and $a'$ to $d'$, corresponding to regeneration; an auxiliary source of energy, such as a battery B; and a plurality of time-element relay devices 70 and 71 for effecting certain automatic control functions to be set forth.

The relay devices 70 and 71 are identical in form and each comprises an actuating coil 72 for electromagnetically operating a movable contact member or bar 73 that slides along a pair of stationary contact members 74, in opposition to the action of a dash-pot 75 when traveling downwardly. Thus, a predetermined time interval ensues after the deënergization of the actuating coil 72 before circuit is broken between the stationary and movable contact members 74 and 73, respectively.

Assuming that it is desired to effect acceleration of the main machines, the master controller MC may be moved to its initial operative position $a$, to close the switches indicated in line $a$ of the sequence chart, Fig. 4, whereby a circuit is established from the positive terminal of the battery B through conductor 80, control fingers 81 and 82 which are bridged by contact segment 83 of the master controller, conductor 84, the parallel-related actuating coils of the switches LS, 1 and 2 and conductor 85 to the negative battery terminal.

A further circuit is completed from the contact segment 83 through control finger 86, conductor 87 and the actuating coil of the switch J to the negative battery conductor 85. The main circuit is thus established from the trolley through line switch LS, actuating coil 25 of the polarized relay 10, conductors 57, 56 and 55, main armature A2, conductor 54, resistor 18, conductor 43, resistor 19, switch J, conductor 44, resistor 17, conductor 50, main armature A1 and conductor 49 to the switch 1, whence circuit is completed as previously traced. Thus, the main-machine armatures are initially connected in series relation with the voltage-reducing resistors 17, 18 and 19.

In position $b$ of the master controller, control fingers 88 and 89 are energized from the contact segment 83, a circuit being continued from control finger 88 through conductor 90, the actuating coil of the switch 3 to a junction-point 91, conductor 115, stationary and movable contact members 74 and 73, respectively, of the time-element relay 71, which has been closed in a manner about to be described, conductor 116, control fingers 117 and 118 which are bridged by contact segment 119 of the master controller, and conductor 120 to the negative battery conductor 85.

The closure of the time-element relay 71 to effect the establishment of the circuit just recited, is accomplished, upon the closure of the switch 4, by the establishment of a circuit from the positively-energized control finger 82, through conductor 125, control fingers 126 and 127 which are bridged by contact segment 128 of the master controller in positions a and b, conductors 129 and 135, the actuating coil 72 of the time-element relay 71, and conductor 136 to the negative battery conductor 85.

In positions of the master controller beyond b, the movable contact member 137 of the switch 4 or the parallel-connected movable contact member 138 of the switch 7, together with conductors 130 and 139, are used to interconnect the conductors 125 and 135. Thus the time-element relay device 71 is maintained closed whenever either the switch 4 or the switch 7 is closed, for a purpose to be set forth.

A further circuit is continued from the control finger 89 through conductor 92, actuating coil of the switch 4, conductor 93, stationary and movable contact members 74 and 73, respectively, of the time-element relay 70, which has been closed in a manner to be set forth, conductors 94 and 95, contact disk 26 of the polarized relay 10 in its upper position corresponding to acceleration, the movable contact members 30 and 33 of the differential relays 12 and 11, respectively, in their lower or normal positions, and conductor 96 to the negative conductor 85.

The closure of the time-element relay 70 is effected to permit the completion of the circuit just described, upon the closure of the switch 3, by the establishment of a circuit from the positively-energized control finger 82 through conductor 125, control fingers 126 and 127 which are bridged by contact segment 128 of the master controller, conductors 129 and 130, movable contact member 131 of the switch 3 in its upper or closed position, conductor 132, the actuating coil 72 of the relay 70 and conductor 133 to the negative conductor 85.

At this time, therefore, the resistors R³ and 19 are short-circuited by the switches 3 and 4, respectively, to effect a certain degree of acceleration of the main machines.

In position c of the master controller, control finger 97 engages the contact segment 83, from which point a circuit is continued through conductor 98, the parallel-related actuating coil of the switches 5 and 7 to conductor 93 and thence through the coöperating contact members of the relay devices 70, 10, 12, and 11, as already traced. Portions of the resistors 17 and 18 are thus short-circuited to further accelerate the main motors.

When the master controller is actuated to its position d, the contact segment 83 completes a circuit through control finger 99, conductor 100 and the parallel-related actuating coils of the switches 6 and 8 to the conductor 93, thereby excluding from circuit the remaining sections of the resistors 17 and 18.

In positions e and f of the master controller, the well-known "bridging" transition of the main machines from series to parallel relation is effected by first opening the switches 3 to 8, inclusive, by means of suitable configuration of the master-controller contact segment 83 and the closure of the parallel-connecting switch M by energizing its actuating coil through control finger 101 and conductor 102. A further circuit is then established from the contact segment 83 through control finger 108, conductor 109 and the actuating coil of the switch G to the negative battery conductor, whereupon the switch J is permitted to open. Under such conditions, the main armatures A¹ and A² are connected in parallel relation in accordance with the previously-described circuits of Fig. 1.

The various active resistors may then be short-circuited in any desired number of steps, as indicated in positions f and g of the sequence chart, Fig. 4.

Assuming that the voltage relation of the momentum-driven dynamo-electric machines and of the supply circuit is suitable for such action, the master controller MC may be moved to its initially operative position a', whereby the switches LS, 1, 2, 5, 6, 7, 8, M and G are closed, as indicated in line a' of the sequence chart.

In position b', the switch 3 is also closed, after stable regenerative conditions obtain, to permit full parallel regenerative operation of the machines.

The various switch-coil circuits are established as follows: from the actuating coil of the switch 3 through junction-point 91, conductor 121, the movable contact member 26 of the polarized relay 10 in its lower or regenerative position, and thence through the contact members 30 and 33 of the differential relays 12 and 11, respectively, in their lower or normal positions, to the negative battery terminal, as previously traced.

The circuit of the actuating coils for the switches 4 to 8, inclusive, is established as already described through the conductor 94, whence the circuit is continued through conductor 140, control fingers 141 and 142 which are bridged by contact segment 143 of the master controller and conductor 144 to the negative battery terminal.

By reason of the electrical relations of the circuits of the time-element relays 70 and 71 with regard to the master-controller contact segments, false relay operation is precluded, since only that relay is operative which it is desired to utilize during the accelerating or regenerative period.

When speed conditions are such that a transition of the machines from parallel to series relation is feasible, the master controller may be moved to position c' to open the resistor short-circuiting switches 5, 6, 7 and 8, close the transition switch J to include the resistor 19 in circuit and open the parallel-connecting switch G. Upon actuation of the master controller to position $d'$, the other parallel-connecting switch M is opened and the resistor short-circuiting switches 5 to 8, inclusive, may then be closed in any desired sequence. In this way, by the use of the transition resistor 19, an undesirable current surge during the changeover from parallel to series relation of the main machine is prevented.

Inasmuch as suitable regulation of the regenerative system to compensate for the gradual decrease of vehicle speed is familiar in the art and since the particular type of regulation is immaterial to the present invention, I have not deemed it necessary to illustrate or describe any such compensating system. It will be understood, however, that the excitation of the main field windings F1 and F2 is gradually increased as the vehicle speed decreases to maintain a steady regenerative current.

The operation of the system under the previously-mentioned abnormal conditions of wheel slippage or skidding will now be set forth: assuming that the machines are operating during series acceleration, for example, so that the series differential relay 11 is operatively connected in circuit and the polarized relay 10 occupies its upper position, in case either main armature A1 or A2 rapidly rotates by reason of slippage of the corresponding vehicle wheels, the unbalanced relation of voltages in the actuating coils 31 and 32 of the series differential relay 11 immediately causes the relay to lift to its upper or open-circuit position. Consequently, the previously-traced circuit of the actuating coils of the switches 4 to 8, inclusive is interrupted and the resistors 17, 18 and 19 are re-inserted in the machine circuits to counteract the abnormal unbalanced voltage conditions of the main machines and thereby tend to eliminate the slippage conditions.

Under slightly abnormal conditions of the class in question, that is, when a relatively slight difference of armature speeds obtains, it is undesirable to weaken the main-machine field excitation and, consequently, the switch 3, which short-circuits the common field-circuit resistor R3, is maintained closed.

However, if slippage conditions persist after the opening movement of the switches 4 to 8, inclusive, then the switch 3 may be opened to weaken the main-field-winding excitation and thus insure the elimination of the abnormal conditions. Such delayed actuation of the switch 3 is effected by reason of the inclusion of the movable contact member 137 or 138 of the switches 4 and 7, respectively, in circuit with the actuating coil 72 of the time-element relay 71. Consequently, upon the opening movement of the switches 4 and 7, the actuating coil 72 is deënergized and the relay device gradually drops to its lower position, in accordance with the retarding action of the dash-pot 75, whereby the actuating coil of the switch 3 is deënergized to permit the opening of the switch and, therefore, the insertion in circuit of the resistor R3 after a predetermined time interval.

The parallel differential relay 12 accomplishes the same function by interrupting the above-mentioned energizing circuit of the resistor short-circuiting switch coils when the machines are connected in parallel relation during the latter part of the accelerating period. Under such conditions, the series differential relay 11 is inoperative by reason of the exclusion of the electrical interlocks J-in from the circuits of the actuating coils thereof, as previously explained.

On the contrary, during regenerative operation, it is desirable first to weaken the main-field-winding excitation, thus resulting in a material reduction of the regenerated current as well as the corresponding torque until the skidding conditions are eliminated. If, however, normal conditions are not restored upon the above-mentioned weakening action of the main-field-winding current, then the resistors 17 and 18 in the main-armature circuit may be rendered active to insure the elimination of the abnormal conditions.

When the machines are operating under parallel regenerative conditions with the polarized relay 10 occupying its lower position marked "Reg.", the occurrence of skidding conditions in any main armature, as evidenced by a marked difference in the currents traversing the actuating coils 28 and 29 of the parallel differential relay 12, causes the relay 12 to lift to its upper or circuit-opening position, whereby the previously traced energizing circuit of the actuating coil for the switch 3 through the coöperating contact members of the polarized relay 10 is interrupted to produce the previously-described partial or complete elimination of the abnormal skidding conditions.

If such abnormal conditions persist, the time-element relay 70, which was deënergized by the opening movement of the switch 3, gradually drops to its open-circuit position in accordance with the action of the dash-pot 75, and after a predetermined time interval, the energizing circuit of the actuating coils for the resistor short-circuiting switches 4 to 8, inclusive, is broken.

It will thus be seen that I have provided an automatically operative system for eliminating abnormal slippage or skidding conditions in an electrical vehicle during both accelerating and regenerative operation with the main machines in either series or parallel relation. During acceleration, the main-armature-circuit resistance is first increased to eliminate the abnormal conditions and if such action is insufficient, the main-machine field windings are then simultaneously weakened by the short-circuiting of a single resistor, while, during regeneration, the converse action is effected.

Referring to Fig. 5, the system illustrates an arrangement corresponding to the previously-described regulating systems to be employed in the case of three series-connected main machines which are respectively provided with armatures A1, A2 and A3 and field windings F1, F2 and F3. The resistor R and the generating armature 36 are connected in circuit in a manner similar to that already set forth. The system further comprises a plurality of voltage differential relay devices 151, and an exciting circuit resistor 152, with short-circuiting switch 153, that respectively correspond to the resistor R3 and the switch 3 of Fig. 1.

Each voltage differential relay 151 comprises an actuating coil 155, all of the coils being connected in series relation across the three main armatures A1, A2 and A3. Differentially-related coils 156 are energized from the respective main armatures and the normal resultant action of the coils 155 and 156 is to maintain the movable contact member 157 in its lower or inactive position. However, as soon as any one of the armatures supplies or receives a voltage differing by a predetermined amount from the average voltage of the machines, in this case one-third of the simultaneous total machine voltage, the corresponding relay device will lift to govern the various machine circuits preferably in a manner similar to that already set forth in Fig. 3.

In Fig. 6, a differential current relay scheme for suitably governing three parallel-related main armatures, in accordance with the principles of my present invention, is illustrated. A relay device 160 is provided, in connection with each main armature A1, A2 and A3, and comprises one actuating coil 161 which is connected in series relation with the corresponding actuating coils of the other relays across a main circuit resistor or shunt 162 that carries the total main-armature or regenerated current. Each relay 160 is further provided with a differentially-related actuating coil 163 which is connected in parallel relation to a shunt or resistor 164 that is connected in each of the individual main-armature circuits.

Consequently, under normal conditions, the actuating coils of each relay device are balanced in their action and maintain the contact members 164 in the illustrated lower position.

However, when the current traversing any one of the main armatures varies materially from the average current of the machines, in this case one-third of the simultaneous total machine current, by reason of slippage or skidding conditions, then the corresponding relay device 160 lifts to interrupt regulating circuits corresponding to those shown in Fig. 3 and thereby eliminate such abnormal conditions, either immediately, in the case of relatively slight variations from normal conditions, or after a predetermined time interval, in the event of serious slippage or skidding.

A further application of the present invention comprises the actuation of rail-sanding devices whenever any one of the differential relays is actuated to an open-circuit or unbalanced position. Such an auxiliary system is fully set forth and claimed in my copending application, Serial No. 70,437, filed January 5, 1916. Inasmuch as the connection between the present invention and the use of such sanding devices will be obvious to those skilled in the art, no illustration or further description thereof is deemed necessary in the present application.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a plurality of dynamo-electric machines severally having armatures and field windings, of a normally inactive translating device connected in common circuit relation with all of said field windings, and means dependent upon a predetermined difference in the machine speeds for rendering said translating device active.

2. In a system of control, the combination with a plurality of dynamo-electric machines severally having armatures and field windings, of a normally short-circuited resistor connected in common series relation with all of said armatures, a single auxiliary source of energy for exciting all of said field windings through said resistor, and relay means electrically dependent upon a predetermined difference in the machine speeds for removing the short-circuit from said resistor.

3. In a system of control, the combination with a plurality of dynamo-electric machines severally having armatures and field windings, of auxiliary means for exciting said field windings, and means dependent upon a predetermined difference of machine speeds for simultaneously reducing the excitation of all said field windings.

4. In a system of control, the combination with a plurality of dynamo-electric machines severally having armatures and field windings, of means dependent upon a difference of machine speeds for dissimilarly modifying machine-circuit connections during different characters of machine operation.

5. In a system of control, the combination with a plurality of dynamo-electric machines severally having armatures and field windings, of means dependent upon slippage or skidding conditions for dissimilarly modifying machine-circuit connections during accelerating and regenerative periods.

6. In a system of control, the combination with a plurality of dynamo-electric machines severally having armatures and field windings, of means dependent upon a predetermined difference of machine speeds for reducing the armature voltage during accelerating periods and for decreasing the field-winding excitation during regenerative periods.

7. In a system of control, the combination with a plurality of dynamo-electric machines severally having armatures and field windings, of means dependent upon a predetermined difference of machine speeds for first reducing the armature voltage and subsequently decreasing the field-winding excitation during accelerating periods and for effecting a converse regulation during regenerative periods.

8. In a system of control, the combination with a plurality of dynamo-electric machines severally having armatures and field windings, of means dependent upon a predetermined difference of machine speeds for effecting a series of regulating operations in a certain order during accelerating period and in the reversed order during regenerative periods.

9. In a system of control, the combination with a plurality of dynamo-electric machines severally having armatures and field windings, of means dependent upon a predetermined difference of machine speeds for immediately effecting the one or the other of two machine-circuit modifications during accelerating and regenerative periods, respectively, and means for effecting the remaining modification in either case after a predetermined time interval.

10. In a system of control, the combination with a plurality of dynamo-electric machines severally having armatures and field windings, of means dependent upon predetermined relatively slight differences of machine speeds for immediately modifying certain machine-circuit connections, and means dependent upon relatively great differences of machine speeds for modifying different machine-circuit connections.

11. In a system of control, the combination with a plurality of dynamo-electric machines severally having armatures and field windings, of means dependent upon predetermined relatively slight differences of machine speeds for immediately modifying certain machine-circuit connections and means dependent upon the persistence of such differences for modifying different machine-circuit connections during the accelerating period, and means for effecting the converse action during the regenerative period.

12. In a system of control, the combination with a plurality of dynamo-electric machines severally having armatures and field windings, of means dependent upon predetermined relatively slight differences of machine speeds for immediately reducing the armature voltage and means dependent upon the persistence of such differences for decreasing the field-winding excitation during the accelerating period, and means for effecting the converse action during the regenerative period.

13. In a system of control, the combination with a plurality of dynamo-electric machines severally having armatures and field windings, of an auxiliary source of energy for said field windings, relay means dependent upon predetermined relatively slight differences of machine speeds for immediately reducing the armature voltage and time-element means dependent upon the persistence of such differences for a predetermined time interval for decreasing the field-winding-excitation during the accelerating period, and a similar set of means for effecting the converse action during the regenerative period.

14. In a system of control, the combination with a plurality of dynamo-electric machines severally having armatures and field windings, of means for effecting "series-parallel" operation of said machines, relay means dependent upon predetermined differences of machine speed as indicated by relative voltage conditions in said machines for modifying certain circuit connections during series relation of the machines, and relay means dependent upon such speed differences as indicated by relative current conditions in said machines for modifying such connections during parallel relation of the machines.

15. In a system of control, the combination with a plurality of dynamo-electric machines severally having armatures and field windings, of means for effecting "series-parallel" operation of said machines, relay means dependent upon predetermined differences of machine speed as indicated by relative voltage conditions in said machines for modifying certain circuit connections during series relation of the machines, relay means dependent upon such speed differences as indicated by relative current conditions in said machines for modifying such connections during parallel relation of the machines, and interlocking means for rendering the first-mentioned relay means inoperative during such parallel relation.

16. In a system of control, the combination with a plurality of dynamo-electric machines severally having armatures and field windings, of a polarized relay device for assuming different operative positions in accordance with the accelerating or regenerative operation of said machines, and relay means dependent upon a predetermined difference of machine speeds and acting in conjunction with said polarized relay device for dissimilarly modifying machine-circuit connections during accelerating and regenerative periods.

17. In a system of control, the combination with a plurality of dynamo-electric machines severally having armatures and field windings, of a polarized relay device for assuming different operative positions in accordance with the accelerating or regenerative operation of said machines, relay means dependent upon predetermined relatively slight differences of machine speeds and acting in conjunction with said polarized relay device for immediately modifying certain machine-circuit connections and means dependent upon the persistence of such differences for a certain time interval for modifying different machine-circuit connections during the accelerating period, and means acting in conjunction with said polarized relay device for effecting the converse action during the regenerative period.

18. In a system of control, the combination with a plurality of dynamo-electric machines severally having armatures and field windings, of a polarized relay device for assuming different operative positions in accordance with the accelerating or regenerative operation of said machines, means for effecting "series-parallel" accelerating operation and "parallel-series" regenerative operation of said machines, relay means dependent upon predetermined differences of machine speed as indicated by relative voltage conditions in said machines and acting in conjunction with said polarized relay device for modifying certain circuit connections during series relation of the machines, relay means dependent upon such speed differences as indicated by relative current conditions in said machines and upon the position of said polarized relay device for modifying such connections during parallel relation of the machines, and interlocking means for rendering the first-mentioned relay means inoperative during such parallel relation.

19. In a system of regenerative control, the combination with a plurality of dynamo-electric machines severally having armatures and field windings, of relay means energized to effect certain compensating changes of field-circuit excitation of all machines while maintaining the general machine-circuit arrangements intact when certain electrical conditions of any one machine differ by a predetermined amount from the corresponding average condition.

20. In a system of regenerative control, the combination with a plurality of series-related dynamo-electric machines severally having armatures and field windings, of relay means energized to effect certain restorative changes of field-circuit excitation of all machines while maintaining the general machine-circuit arrangements intact when the voltage of any one machine differs by a predetermined amount from the simultaneous average voltage of the machines.

21. In a system of control, the combination with a plurality of parallel-related dynamo-electric machines severally having armatures and field windings, of relay means energized to effect certain changes of machine-circuit connections of all machines while maintaining them in parallel relation when the current traversing any one machine differs by a predetermined amount from the simultaneous average current of the machines.

In testimony whereof, I have hereunto subscribed my name this 28th day of June, 1917.

RUDOLF E. HELLMUND.